United States Patent [19]
Walton et al.

[11] Patent Number: 6,161,839
[45] Date of Patent: Dec. 19, 2000

[54] VALVE SEAL ASSEMBLY

[75] Inventors: Kevin A. Walton, Manchester, Conn.; Joseph H. Campana, Shoreline, Wash.

[73] Assignee: United Technologies Corporation, Hartford, Conn.

[21] Appl. No.: 09/031,274

[22] Filed: Feb. 27, 1998

[51] Int. Cl.[7] .................................................. F16J 15/32
[52] U.S. Cl. ........................... 277/590; 277/188; 277/189
[58] Field of Search .................................... 277/590, 628, 277/630, 631, 637, 640, 641, 642, 644, 645

[56] References Cited

U.S. PATENT DOCUMENTS

| | | |
|---|---|---|
| 3,693,986 | 9/1972 | Lambie .................................... 277/188 |
| 4,015,818 | 4/1977 | Tawakol ................................... 251/307 |
| 4,184,689 | 1/1980 | Brodell et al. ............................. 277/26 |
| 4,508,355 | 4/1985 | Ditcher .................................... 277/189 |
| 4,827,713 | 5/1989 | Peterson et al. ........................ 60/226.1 |
| 5,080,556 | 1/1992 | Carreno .................................... 415/170 |

*Primary Examiner*—B. Dayoan
*Assistant Examiner*—Mark Williams
*Attorney, Agent, or Firm*—Kenneth C. Baran

[57] ABSTRACT

The invention is a valve seal assembly (43) illustrated in the context of a compressor bleed valve (36) for a gas turbine engine. The seal assembly includes a seal carrier (44) having a circumferentially extending groove (72) bordered by a pair of opposing flanges (74). The flanges cooperate to define a recess (76) portion of the groove and a throat (78) portion of the groove. The seal assembly also includes one or more seal elements (46) each having a base (82), conformal with the recess, and longitudinally captured in the recess by the flanges. A stem (84) extends from the base and projects through the throat, and a sealing bead (86) extends from the stem. An insert (88) extends circumferentially in the base for stiffening the base about a circumferential bending axis (C). An access port (96) facilitates installation and removal of the seal elements (46) and a cover (98) traps the seal elements in the carrier (44). During operation of the valve, shearing forces act on the seal elements as the valve approaches its fully closed position. The flanges and the stiffness of the insert resist any tendency of the shearing forces to peel the seal element out of the groove.

7 Claims, 5 Drawing Sheets

VALVE SEAL ASSEMBLY

CROSS REFERENCE TO RELATED APPLICATIONS

This application includes subject matter related to commonly owned copending patent application Ser. No. 09/031,735 entitled "Bellcrank Mechanism", filed Feb. 27, 1998.

TECHNICAL FIELD

This invention pertains to seal assemblies for impeding fluid flow through a valve and particularly to a damage resistant, easily maintainable seal assembly suitable for demanding applications such as compressor bleed valves in gas turbine engines.

BACKGROUND OF THE INVENTION

Gas turbine engines include one or more compressors for pressurizing, a working medium fluid, typically ambient air, that flows through a longitudinally extending compressor flowpath. Under some operating conditions, it is desirable to temporarily moderate the pressure at the discharge end of the compressor to prevent or recover from compressor stall or other aerodynamic instabilities. Pressure moderation is usually effected by opening a compressor bleed valve that diverts a portion of the pressurized fluid from the discharge end of the compressor flowpath into a lower pressure region.

An exemplary compressor bleed valve is described in U.S. Pat. No. 4,827,713, which is assigned to the assignee of the present application, and whose contents are incorporated herein by reference. The disclosed valve includes a stationary orifice ring hating a pair of resilient seal members adhesively bonded into respective channels on longitudinally facing surfaces of the ring. A series of circumferentially distributed passages extends through the orifice ring to join the compressor flowpath to a surrounding annular chamber. The compressor valve also includes a moveable valve ring with a cylindrical sleeve and a pair of seal seats radially aligned with the orifice ring seal members. A set of pins extends radially from the valve ring, and each pin includes a roller that engages a carved slot on the orifice ring. A bellcrank for operating the valve ring is mounted on a bellcrank support bracket by a bellcrank pivot. Input and output arras of the bellcrank are connected respectively to an actuator (not illustrated in the reference) and to the valve ring.

In operation, the actuator rotates the bellcrank about the bellcrank pivot so that the bellcrank, in turn, drives the valve ring in a spiral motion, positioning the sleeve to cover or uncover the passages. The rollers help guide the valve ring in its spiral path. As the valve ring approaches its fully closed position, the seal seats contact the seal members, compressing them in the longitudinal direction to effect a fluid tight seal. However because the valve ring moves with a spiral motion, the seats also exert a circumferentially directed shearing force on the seal members. Over time, repeated application of the shearing force can erode the seal members, or can peel or tear the members out of their channels, compromising the integrity of the seal and enabling working medium fluid to leak through the valve, even when the valve is in its fully closed position.

In an alternative configuration of the valve, not shown in the reference, the seal members are adhesively mounted on the valve ring. In yet another alternative configuration, also not shown, one seal member is mounted on the valve ring and one on the orifice ring. However these alternative configurations in no way ameliorate the potential for damaging the seal members since valve closure inevitably produces relative circumferential shearing motion between the seal members and the seal seats.

Damage to the compressor valve seal members, as described above, is undesirable for a number of reasons. The fluid leakage degrades the efficiency of the compressor, increasing engine fuel consumption and operating expense. Collateral damage can occur to engine components located in either the annular chamber surrounding the compressor flowpath, or in a secondary flowpath connected to the annular chamber, since those components are not necessarily tolerant of extended exposure to the elevated temperature of the working medium fluid (sometimes in excess of 400 degrees F.). If the liquid leakage becomes severe enough to warrant replacement of the seal members, further difficulties are encountered because the compressor valve is not readily accessible in a fully assembled engine. Once the engine is partially disassembled to gain access to the valve, the deteriorated seal members are troublesome to remove since the repair technician is obliged to disbond the seal members from their channels, and laboriously cleanse the channels of any residual adhesive. The subsequent reinstallation and bonding of new seal members can be similarly tedious and labor intensive.

Use of the above described valve arrangements in the latest generation of turbine engines will only exacerbate the shortcomings of the sealing arrangement. The compressors in these newer engines pressurize the working medium fluid to pressures and temperatures higher than those typically seen in older generation engines. The higher temperatures weaken the adhesive bond holding the seal members in place and therefore increase the likelihood that the seal members will be peeled out of the channels. In addition, the valve actuation system of newer generation engines applies a greater longitudinal compressive force to the valve ring and seal members, resulting in a correspondingly greater shearing force acting on the seal members during valve closure.

One further disadvantage of the prior art valve occurs because the bellcrank exerts an actuation force on the valve ring at only a single circumferential location. As a result, the valve ring deflects slightly during valve closure so that a relatively tight seal is formed at locations circumferentially close to the bellcrank, and a looser, less effective seal is formed at locations circumferentially displaced from the bellcrank. Although this problem could be addressed by applying actuation forces at multiple circumferential locations, the accompanying additional hardware, and the possible need to synchronize multiple actuators, makes this solution prohibitively complex and undesirable. A simpler solution is to circumferentially bias the longitudinal position of the valve ring so that when the valve ring is not in its fully open position, the longitudinal spacing between each seal member and its seal seat varies circumferentially. According to the prior art, the variation in longitudinal spacing is symmetric relative to a diametral line through the bellcrank attachment location. That is, the longitudinal spacing is equal at locations that are equiangularly displaced in opposite directions (clockwise and counter clockwise) from the bellcrank. This solution has also proved to be unsatisfactory since it fails to recognize that valve ring deflections arising from bellcrank actuation forces are not distributed symmetrically about the diametral line.

In view of the above described shortcomings an effective, highly durable, easily maintainable valve seal assembly is sought.

SUMMARY OF THE INVENTION

According to the invention a valve seal assembly includes a seal carrier with a groove bordered by opposing flanges, and a conformal seal element captured by the flanges and selectively stiffened by an insert so that the seal element resists being peeled out of the grove by circumferentially directed shearing forces. According to fine aspect of the invention, the seal carrier includes an access port through which the seal element may be installed or removed, and a removable cover to trap the seal element in the carrier. In one embodiment of the invention the insert is an array of flexibly interconnected tabs that extend circumferentially through a base portion of the seal element. The tabs resist bending about a circumferential bending axis so that the base is unlikely to be pulled longitudinally past the flanges, while the flexible interconnection between the tabs allow the seal element to follow the typically arcuate contour of the seal carrier.

The invention is advantageous because its durability and reliability guard against undesirable fluid leakage through the valve, thereby ensuring peak compressor efficiency and shielding temperature intolerant engine components from extended exposure to high temperature fluid. The durability of the seal assembly also minimizes the frequency with which an engine owner must bear the expense and inconvenience of partially disassembling the engine to replace the seal element. On those occasions when seal element replacement becomes necessary, ease of replacement is ensured by the access port in the seal carrier and by the absence of an adhesive bond between the seal element and the seal carrier.

The foregoing features and advantages and the operation of the invention will become more apparent in light of the following description of the best mode for carrying out the invention and the accompanying drawings.

BEST MODE FOR CARRYING OUT THE INVENTION

Figure 1:
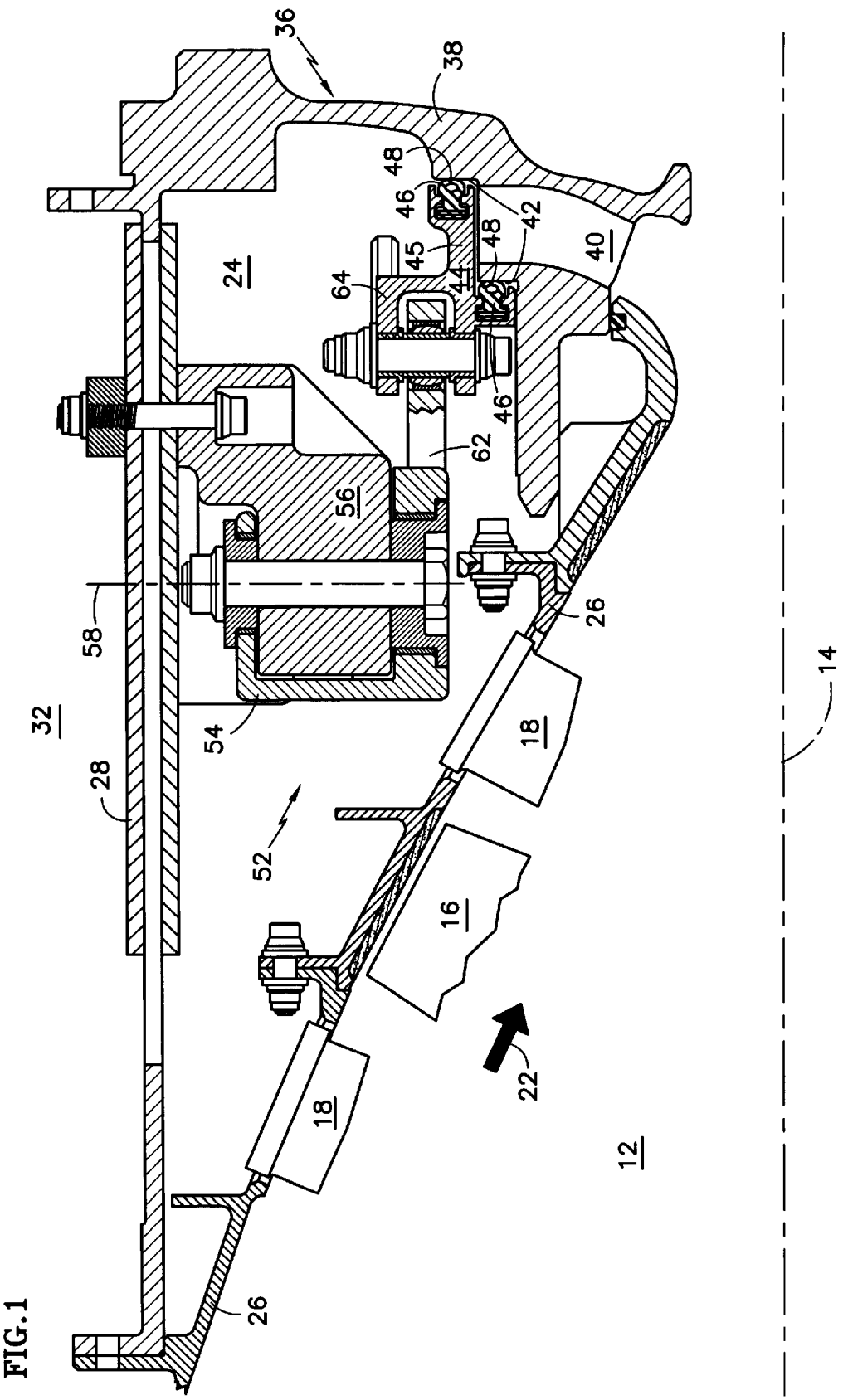
FIG. 1 is a side view of the discharge end of a gas turbine engine compressor showing a compressor bleed valve with a valve seal assembly according to the present invention for diverting working medium fluid out of an annular compressor flowpath.

FIG. 1 illustrates a portion of the discharge end of an axial flow compressor for a turbofan gas turbine engine. The compressor has an annular flowpath 12 disposed about a longitudinally extending compressor centerline 14. Multiple rows of rotatable blades 16 and nonrotatable vanes 18 extend across the flowpath for compressing a working medium fluid 22 that flows longitudinally through the flowpath. An annular cavity 24, radially bounded by a compressor case 26 and a support frame 28 circumscribes the compressor flowpath. A secondary flowpath 32 circumscribes the cavity 24 and communicates therewith by way of permanent openings, not visible, in the frame.

The compressor also includes a valve 36 for diverting pressurized fluid out of the compressor flowpath and into the secondary flowpath 32 by way of the cavity 24. The valve includes a stationary orifice ring 38 having a series of passages 40 joining the compressor flowpath to the cavity, and a pair of longitudinally facing inner and outer seal seats 42. The valve also includes a seal assembly 43 (FIG. 2) comprising a moveable valve ring or seal carrier 44 with a cylindrical sleeve 45 and having one or more resilient seal elements 46 mounted thereon as described in more detail below. The valve ring is longitudinally positionable between a fully closed position and a fully open position to regulate fluid flow through the passages 40. With the valve ring in the illustrated, fully closed position, the sleeve 45 covers the passages 40 and the seal elements 46 are compressed against their respective seal seats 42 to form leakage resistant seal interfaces 48 that inhibit fluid leakage out of the compressor flowpath.

An actuation system for positioning the seal carrier 44 includes a bellcrank 52 having a clevis 54 pivotably mounted on a support bracket 56 so that the bellcrank is rotatable about a bellcrank axis 58. An output arm 62 radiating from the clevis is connected to a lug portion 64 of the seal carrier. In operation, an actuator, not shown, rotates the bellcrank 52 about the bellcrank axis 58. The bellcrank, in turn, drives the valve ring in a spiral motion, as described in U.S. Pat. No. 4,827,713, the contents of which are incorporated herein by reference, so that sleeve 45 covers or uncovers the passages 40.

Figure 2:
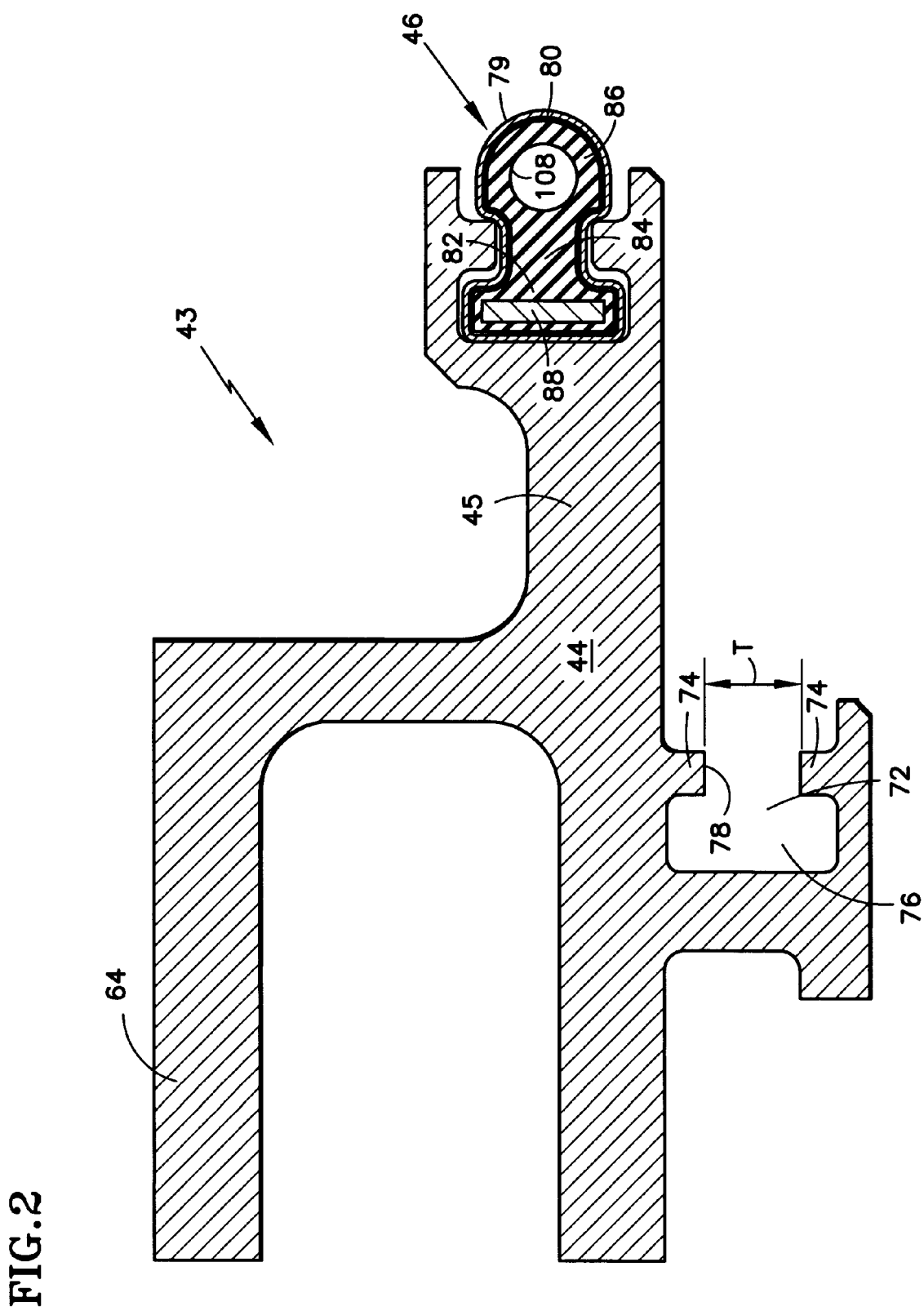
FIG. 2 is an enlarged side view illustrating the valve seal assembly of FIG. 1 in isolation.
Figure 3:
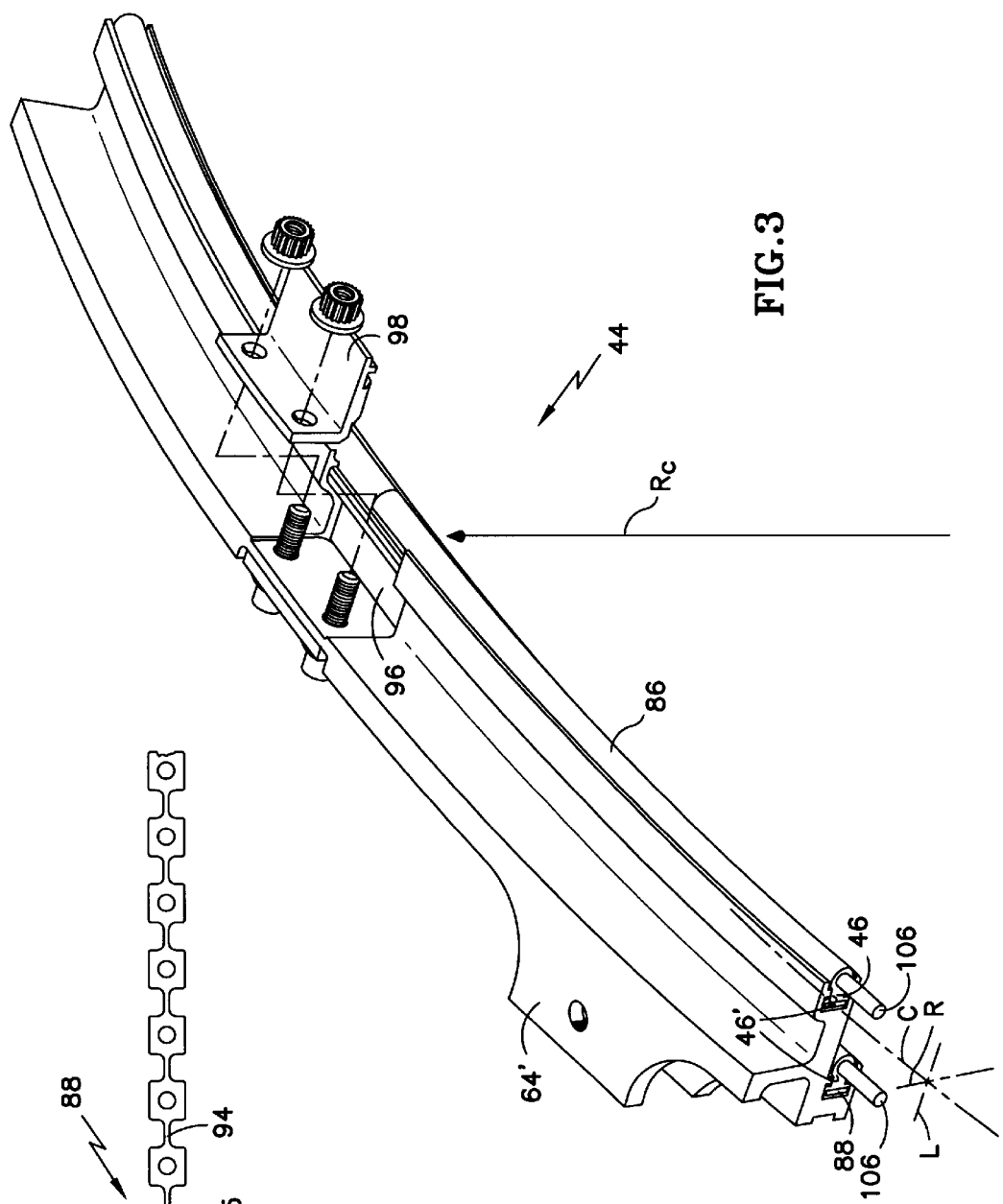
FIG. 3 is a perspective view of a sector of the seal assembly of FIG. 1 in isolation and snowing a port for accessing a seal element of the seal assembly, and a removable cover for trapping the seal element in the carrier.

Referring now to FIGS. 2 and 3, the seal carrier 44 has a pair of circumferentially extending grooves 72. Each groove is bordered by a pair of opposing flanges 74 that cooperate to define a groove recess 76 and a distinct throat 78 having a maximum radial dimension T. A seal element, 46 only one of which is illustrated, is longitudinally captured in each groove by the flanges. The seal elements are made of silicone rubber and have a low friction fabric outer lining 79 and two internal plies of reinforcing fabric 80. Each seal element has a base 82 whose cross sectional shape closely conforms to that of the recess 76. Each seal element also includes a stem 84 that projects through the throat 78, and a sealing bead 86. In the illustrated embodiment the sealing bead 86 is a hollow bulb. With the valve in its fully closed position, (FIG. 1) the beads contacts the respective seal seats 42 on the orifice ring 38 to form the seal interface 48.

Figure 4:
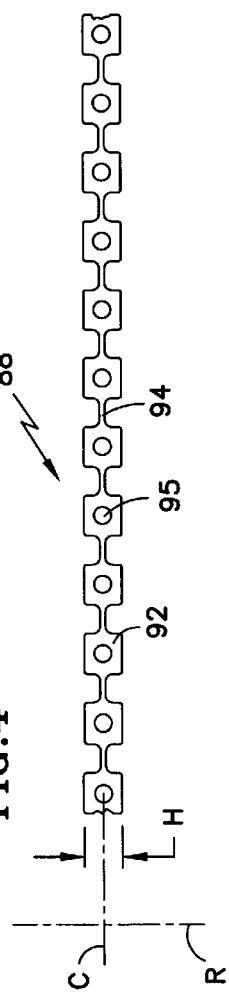
FIG. 4 is a plan view of an insert for selectively stiffening a base portion of the seal element.

Each seal element 46 also includes an aluminum insert 88, seen in greater detail in FIG. 4, extending circumferentially in the seal base 82. The insert is an array of tabs 92 flexibly interconnected by links 94. Each tab has a minimum height H greater than the radial dimension T of the groove throat 78. Each tab also has a central aperture 95 so that when the seal element is manufactured, the uncured silicone rubber material from which the seal element is made can permeate through the apertures. Thus, after the silicone rubber is cured, the insert is embedded in the seal element base and positively locked into position. Because of the tab and link construction of the insert, both the insert and the seal base have directionally selective flexibility. The insert and base are stiff relative to a circumferential bending axis C. As a result, the base resists deformation that would allow the seal element to be pulled longitudinally past the flanges 74 and thus be pealed out of the groove 72. However the flexible links 94 allow the insert to be compliant relative to a longitudinal bending axis L so that the insert can follow the curved contour of the seal carrier. The insert is also compliant about a radial bending axis R. The links 94 also keep the tabs 92 circumferentially separated during manufacture of the seal element 46. If the links were not present, and the insert instead comprised individual independent tabs, those individual tabs could migrate circumferentially during manufacture of the seal element until the silicone rubber cured sufficiently to freeze the tabs in place. As a result, the tabs would be distributed nonuniformly, and the desired stiffness of the seal base 82 would be locally compromised.

The seal carrier 44 has an access port 96 (FIG. 3) to facilitate installation and removal of the seal elements, and a removable cover 98 bolted onto the seal carrier to cover the port and trap the seal elements in the carrier. In principle, the access port may be situated at any desired location around the circumference of the seal carrier. However the presence of the port locally diminishes the strength of the seal carrier and therefore its ability to withstand the valve actuation forces exerted on the carrier by the bellcrank arm 62 (FIG. 1). In practice, therefore, the port is situated approximately diametrically opposite the seal carrier lug 64 to which the bellcrank is connected.

Figure 5:
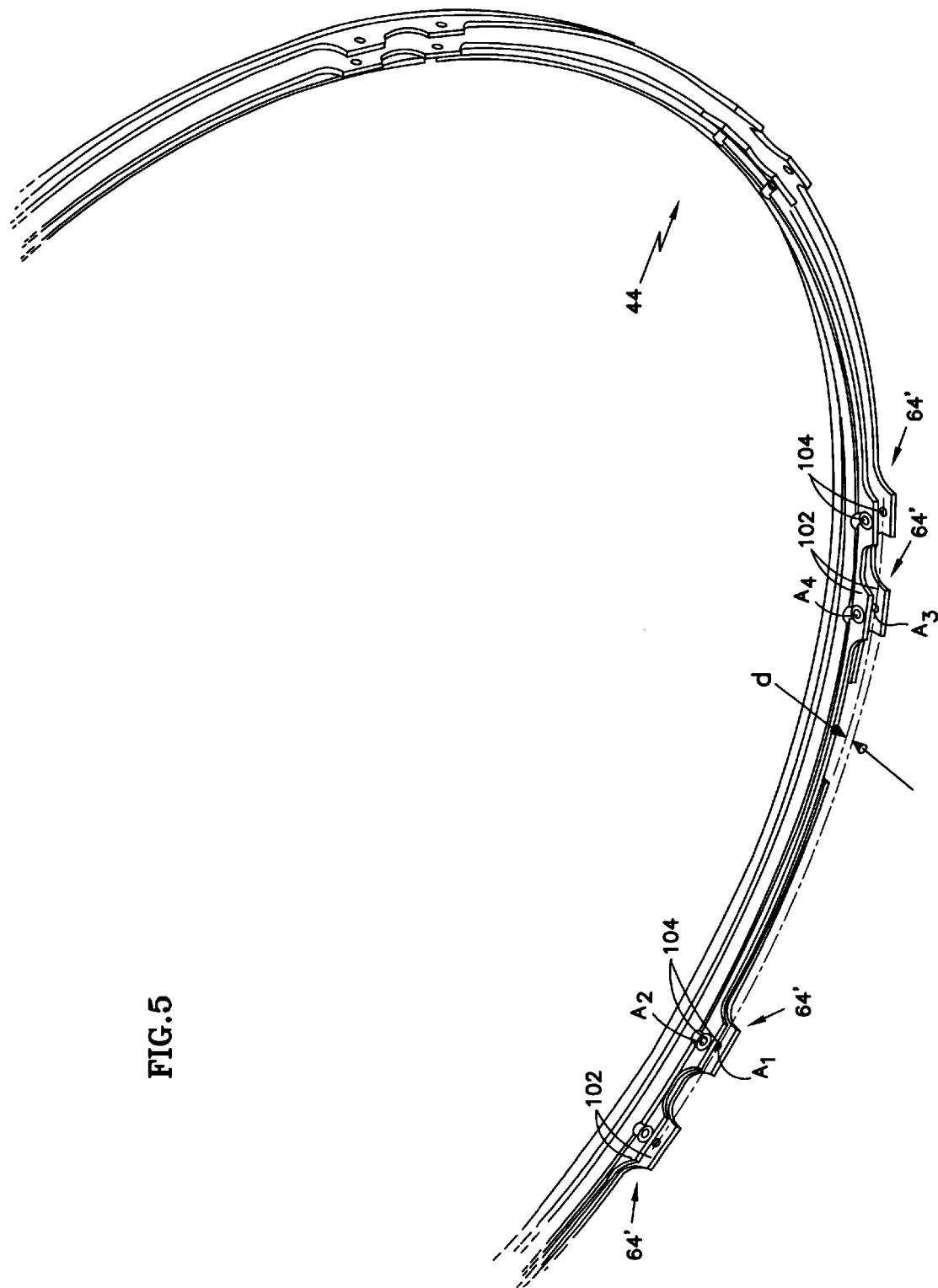
FIG. 5 is a perspective view of a portion of a seal carrier of the present invention illustrating a longitudinal offset between guide roller mounting apertures on circumferentially adjacent seal carrier lugs.
Figure 6:
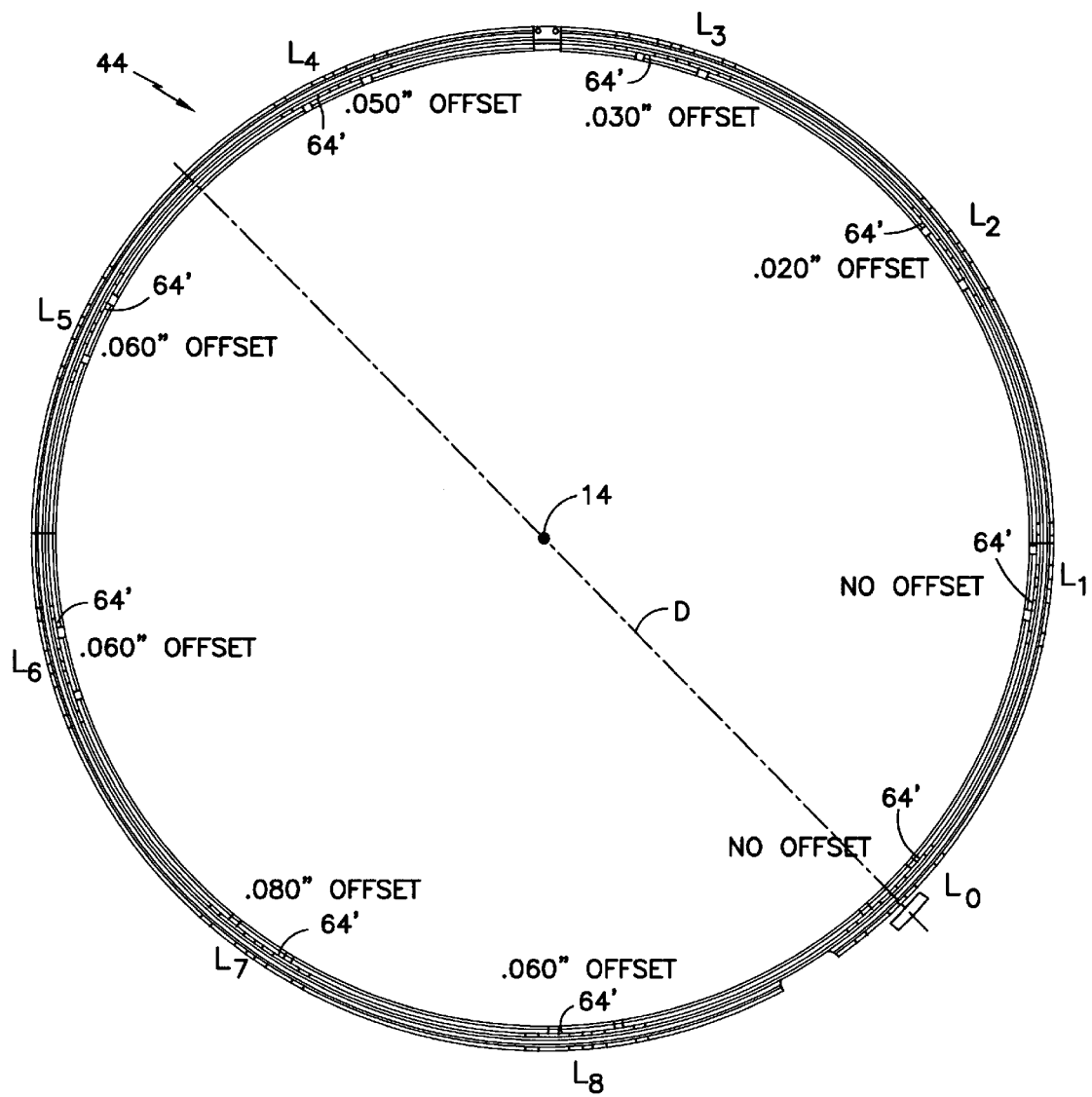
FIG. 6 is an end view of the seal carrier of the present invention illustrating an asymmetric longitudinal offset of the guide roller mounting apertures as a function of circumferential position.

One further feature of the seal carrier is predicated on the recognition that seal carriers deflections arising from actuation forces are not symmetrically distributed relative to the location at which the bellcrank is attached to the carrier. Referring now to FIG. 5, the seal carrier 44 has circumferentially distributed lugs 64', identical to the lug 64 (FIG. 1) to which the bellcrank arm is attached. These lugs have inner and outer ears 102 so that the lugs serve as attachment brackets for guide rollers (such as the guide rollers described in detail in the reference patent) and include mounting apertures 104 or other functionally equivalent means for securing the rollers to the seal carrier. In the illustrated seal carrier, the apertures in some of the brackets are longitudinally offset relative to the apertures in other attachment brackets. For example, apertures $A_1$ and $A_2$ are longitudinally offset from apertures $A_3$ and $A_4$ by a small offset distance d. Moreover, as seen in FIG. 6, the amount of longitudinal offset is asymmetric relative to a diametrical line D through the lug 64 to which the bellcrank is attached. Specifically, the apertures at the lugs individually designated $L_1$, through $L_8$ are offset by 0, 0.020, 0.030, 0.050, 0.060, 0.060, 0.080 and 0.060 inches respectively relative to the apertures at the lug $L_0$. The asymmetric character of the offset distance is a departure from past practice which, failing to recognize the asymmetric nature of the valve ring deflections, relied on symmetric offsets. The offset distance biases the carrier in the longitudinal direction so that when the valve is open (i.e. when the carrier is positioned so that the sleeve 45 uncovers the passages 40) the longitudinal separation between each seal element 46 and its respective seal seat 42 is circumferentially nonuniform. When the valve is moved toward its closed position, the valve carrier deflects slightly as described in the preceding discussion of the valve ring of the prior art bleed valve. In the present invention, however, the asymmetric axial offset d of the apertures 104, and the attendant asymmetrically circumferentially nonuniform spacing between the seal elements 46 and their respective seal seats 42 compensates for the deflections. As a result, the tightness of the seal at seal interfaces 48 is substantially circumferentially uniform when the valve 36 is closed.

Each seal element 46 ideally comprises a plurality of seal element segments, such as representative segments 46' seen in FIG. 3. Each segment is connected to a circumferentially adjacent segment by a silicone rubber connector 106 bonded to the interior surface 108 (FIG. 2) of the sealing bulb. The connectors help to seal between the ends of circumferentially adjacent seal element segments and damp vibration of the ends of the segments.

In operation, the invention offers advantages over the seal assembly shown in the reference patent. As the valve approaches its fully closed position, the low friction lining 79 on each seal element minimizes the shearing forces that tend to peel the seal element out of its grooves. To the extent that these shearing forces are nevertheless present, the flanges 74 bordering the groove recess 76 help to retain the seal element in the groove. The aluminum insert 88 augments the stiffness of the seal base about a circumferential bending axis C to further resist disengagement of the seal base from the groove recess. When replacement of a seal element is necessary, the old element may be easily removed by removing the seal carrier cover 98 and sliding the seal element circumferentially out of the groove by way of the access port 96. Unlike the prior art arrangement, no disbanding or removal of residual adhesive is required. A new seal may then be slid circumferentially into the groove by way of the access port, and the cover reinstalled.

Although the invention has been shown and described as an arcuate seal assembly having a finite radius of curvature, those skilled in the art will recognize that the invention also embraces the special case of a linear seal assembly, i.e. one having an infinite radius of curvature $R_c$. In this case, the circumferential and radial directional designations used in the preceding description would merely be replaced by terminology more appropriate for a Cartesian reference frame. These and other changes, modifications and adaptations can be made without departing from the invention as set forth in the accompanying claims.

What is claimed is:

1. A seal assembly for impeding fluid flow past a seal interface, comprising:
   a seal carrier having a circumferentially extending groove, the groove having a recess portion bordered by opposing flanges, the flanges cooperating to define a throat portion of the groove, the throat portion having a maximum radial dimension; and
   a seal element having a base, substantially conformal with the recess and longitudinally captured therein by the flanges, a stem extending from the base and projecting through the throat, a bead extending from the stem, and an insert extending circumferentially in the base, the insert comprising an array of tabs flexibly interconnected by links, the tabs having a minimum height greater than the throat maximum radial dimension and having sufficient stiffness to resist extraction of the seal element longitudinally past the flanges.

2. The seal assembly of claim 1 wherein the seal element is embedded in the seal element base and each tab has an aperture therethrough so that the material from which the base is made permeates through the apertures.

3. The seal assembly of claim 1 wherein the seal element comprises a plurality of seal element segments, each segment being connected to a circumferentially adjacent seal element segment by a connector.

4. The seal assembly of claim 1 wherein the seal carrier includes an access port for facilitating installation and removal of the seal element, and a removable cover to trap the seal element in the carrier.

5. The seal assembly of claim 1 wherein the seal carrier is longitudinally positionable and includes circumferentially distributed lugs, one lug serving as a bellcrank attachment lug, the lugs other than the bellcrank attachment lug serving as attachment brackets for guide rollers and having mounting means for securing the rollers to the seal carrier, the mounting means in at least some of the brackets being arranged to effect circumferentially nonuniform longitudinal separation between the seal element and a seal seat when the seal assembly is in a position other than a fully closed position, the nonuniform separation being asymmetric about a diametral line extending through the bellcrank attachment lug.

6. The seal assembly of claim 5 wherein the mounting means are mounting apertures in the brackets and the mounting means in at least some of the brackets are longitudinally offset relative to the mounting means in the other of the brackets to circumferentially bias to the carrier in a longitudinal direction.

7. The seal assembly of claim 1, wherein the sufficient stiffness is stiffness about a circumferential bending axis and wherein the insert also has a stiffness about a longitudinal bending axis less than the stiffness about the circumferential bending axis.

* * * * *